United States Patent [19]
Smith

[11] 3,865,756
[45] Feb. 11, 1975

[54] CLEANING COMPOSITION
[75] Inventor: Timothy J. C. Smith, Lansdale, Pa.
[73] Assignee: Amchem Products, Inc., Ambler, Pa.
[22] Filed: Aug. 14, 1972
[21] Appl. No.: 280,094

[52] U.S. Cl................. 252/529, 252/119, 252/139, 252/159
[51] Int. Cl. ........ C11d 3/16, C11d 3/18, C11d 3/075
[58] Field of Search ........... 252/529, 139, 153, 118, 252/125, 119, 158, 159; 424/49, 50; 51/308

[56] References Cited
UNITED STATES PATENTS
2,381,124 8/1945 Hart.................................... 252/539
3,210,287 10/1965 Kelly et al........................... 252/139

FOREIGN PATENTS OR APPLICATIONS
679,056 1/1964 Canada

OTHER PUBLICATIONS
Industrial Detergency, Niven, p. 323.
Condensed Chemical Dictionary, 7th Edition, p. 630.

*Primary Examiner*—Mayer Weinblatt
*Assistant Examiner*—Edith L. Rollins
*Attorney, Agent, or Firm*—Synnestvedt & Lechner

[57] ABSTRACT

A cleaning composition, particularly adapted for cleaning painted aluminum surfaces, preferably comprising an organic cleaning solvent, a small particle size gelling agent having abrasive properties, a wetting agent, an alkaline cleaning agent, and preferably an abrasive having a larger particle size than said gelling agent.

20 Claims, No Drawings

3,865,756

CLEANING COMPOSITION

FIELD OF THE INVENTION

This invention relates to a cleaning composition. More specifically, this invention relates to a composition for cleaning surfaces, particularly painted aluminum siding.

Within recent years, painted aluminum siding has been more and more widely accepted as a substitute for wood siding, brick, stone, etc. in the construction of dwellings and other buildings. One of the principal advantages of painted aluminum siding is that it does not have to be repainted for relatively long periods of time, for example, for periods of 10 to 30 years.

Although the paint film on aluminum siding resists flaking and peeling for extended periods of time, the paint film has a tendency to become dirty as a result of foreign materials which settle thereon from the atmosphere or which are impinged thereon by the force of winds or which are deposited thereon by water which comes into contact with the siding. The foreign materials or soils can consist of a variety of substances including, for example, soot, grime, smut, and impurities from the exhaust fumes of vehicles, such as cars, trucks and airplanes. The foreign materials can themselves impart a dirty or unsightly appearance to the paint film or they may react with ingredients in the paint film to form unsightly substances. The unsightly appearance can consist of an overall dirty appearance or it can consist of streaked areas caused by water, for example rain water or melting snow, which drips or runs down a specific area on the siding. The unsightly appearance is particularly severe when buildings are located in industrial areas.

The dirty appearance of the painted aluminum siding is particularly severe if the paint does not chalk. The term "chalk" refers to the ability of the paint to develop a powdery surface or film as a result of the degradation of the paint binder. A "chalking" paint can be considered to be self-cleaning because the powdery film containing soils can be readily removed by light rubbing or by water, for example rain water, which wastes it away. Many available aluminum paints are "non-chalking" during the first 5 years after application. Thus, during this time, the paint is not self-cleaning and foreign materials which settle or are deposited on the paint film continue to build-up and impart an increasingly dirty appearance to the paint film. Even after the paint begins to chalk, the nature of the soils may be such that they are not removed readily by the self-cleaning properties of the paint.

The present invention relates to a composition for cleaning paint films, particularly paint films adhered to aluminum.

BACKGROUND OF THE INVENTION

A composition for cleaning painted aluminum siding satisfactorily should have a number of different characteristics. It should be effective in removing all of the many different types of soil which dirty, discolor or stain the paint film. And the composition should be capable of accomplishing this without hard rubbing. Also, the cleaning composition should not affect adversely the paint film; for example, the composition should not dull the gloss of the paint film or abrade it.

It has been found that many types of conventional cleaning compositions are ineffective for cleaning painted aluminum siding satisfactorily for one or more reasons. More specifically, cleaning compositions containing alkaline cleaning agents or surface active agents, or organic solvents, etc. or mixtures of these ingredients were found to have one or more shortcomings. Such shortcomings included: the inability to remove all of the many different types of soils that tend to be deposited on the paint film; the inability to remove the soils with light rubbing; and the inability to clean the paint film without abrading it.

In view of the above, it is an object of this invention to provide a composition for cleaning paint films, particularly paint films applied to aluminum surfaces.

Another object of this invention is to provide a method for cleaning painted aluminum which has deposited thereon foreign materials which tend to make the siding appear unsightly.

These objects are attained and other important developments are afforded by the present invention which is described below.

BRIEF DESCRIPTION OF THE INVENTION

In accordance with this invention there is provided a gelled cleaning composition comprising an organic cleaning solvent which is gelled or thickened with a gelling agent which preferably functions also as an abrasive. Such compositions exhibit cleaning properties; however, in accordance with the preferred form of the invention, the cleaning composition contains in addition to the organic cleaning solvent and gelling agent, other ingredients, including a wetting agent, an alkaline cleaning agent and most preferably an abrasive which exhibits more effective abrasive properties than those exhibited by a gelling agent which functions also as an abrasive.

The preferred composition within the scope of the present invention comprises:

| Ingredients | Percent by Weight |
| --- | --- |
| organic cleaning solvent | about 55 to about 90% |
| gelling agent for organic solvent which functions as an abrasive | about 1 to about 5% |
| wetting agent | about 1 to about 10% |
| alkaline cleaning agent | about 1 to about 15% |
| abrasive | 0 to about 20% |

With respect to preferred ingredients comprising the composition of the present invention, the following have given excellent performance in the cleaning of dirty painted aluminum surfaces: organic cleaning solvent — Stoddard solvent; gelling agent having also abrasive properties — colloidal silica; alkaline cleaning agent — aqueous solution of a mixture of a water soluble metal phosphate and silicate; and abrasive — calcium silicate. To achieve outstanding cleaning of painted aluminum surfaces, including painted aluminum siding, which are unsightly in appearance as a result of the presence thereon of soils or foreign matter, the use of the following composition is most highly recommended.

| Ingredients | Percent by Weight |
| --- | --- |
| Organic Cleaning Solvent | |
|   Stoddard solvent | about 65 to about 75% |
|   ethylene glycol monobutylether | about 4 to about 7% |
| Gelling Agent - colloidal silica | about 3 to about 5% |
| Alkaline Cleaning Agent | |
|   monoethanolamine aqueous solution containing about 10 to about 15 wt. % of tetra potassium pyrophosphate, about 35 to about 40 wt. % of sodium silicate and about 45 to about 55 wt. % water | about 3 to about 8% |
| | about 5 to about 10% |
| Abrasive - calcium silicate | about 0 to about 15% |
| nonionic wetting agent | about 5 to about 10% |

The present invention provides a cleaning composition which can be used to clean painted aluminum siding having a variety of different types of soils accumulated thereon in the absence of hard rubbing. In addition, the cleaning composition does not affect the paint film adversely. The cleaning composition has a consistency or body such that it can be spread easily on the surface to be cleaned, for example, by the use of a sponge, and after being so applied, it does not run off the surface. After the cleaning composition is applied, and preferably rubbed over the surface lightly or with a firm rubbing action, it can be rinsed readily from the surface, for example, by hosing with water. The composition can be used to clean not only painted surfaces, including painted metal and wood surfaces, but it can be used also to clean metal surfaces which do not have a final finish.

DETAILED DESCRIPTION OF THE INVENTION

The organic solvent should be capable of removing various types of organic and inorganic materials which comprise the soil to be removed from the surface to be cleaned. Such solvents are well known and are widely available. In utilizing the cleaning composition to clean a paint film, the solvent should be one which does not affect adversely the paint film, for example, by dissolving the paint, dulling gloss, or otherwise degrading the paint. The organic solvent should also possess the property of low volatility. Preferably the organic solvent should be non-toxic and non-flammable, and also should be non-corrosive to the equipment used for application. Examples of organic solvents which can be used include: low molecular weight alcohols, for example, those having 2 to about 4 carbon atoms, such as isopropanol; hydrocarbons such as mineral spirits; halogenated, particularly chlorinated, hydrocarbons such as 1,1,1-trichloroethane; and high boiling ethers, that is those ethers having a flash point of greater than about 35°C, such as ethylene glycol monoalkyl ethers wherein the alkyl group has 1 to 4 carbon atoms, for example, ethylene glycol monoethyl ether and ethylene glycol monobutyl ether.

Excellent results have been obtained by utilizing Stoddard solvent, an aliphatic hydrocarbon mineral spirit. In addition to its excellent cleaning properties, Stoddard solvent is readily available in bulk quantities at relatively low prices. Thus, Stoddard solvent is a preferred organic solvent for use in the composition of the present invention. Most preferably the organic cleaning solvent comprises a mixture of Stoddard solvent and ethylene glycol monobutyl ether.

The amount of organic solvent comprising the composition should be about 55 to about 90 wt. %. Lower amounts of solvent tend to give a composition which does not have the desired consistency or body. Higher amounts of the organic solvent tend to reduce the overall cleaning effectiveness of the composition. Most preferably, the organic cleaning solvent comprises about 65 to about 80 wt. % of the composition.

The cleaning composition must contain also a gelling agent for the organic solvent. The gelling agent should be effective in forming a composition having a consistency such that the composition does not flow excessively when it is applied to a vertical surface which is to be cleaned. The gelling agent should be one which is capable of being dispersed uniformly throughout the composition. Gelling agents which are incapable of coagulating the composition uniformly or which form lumps that cannot be uniformly dispersed throughout the composition should be avoided.

The preferred gelling agent is one which functions also as an abrasive for penetrating and loosening the foreign materials which are present on the paint film. Examples of preferred gelling agents which so function include finely divided silicas which are colloidal in nature. Such colloidal silicas, which have thixotropic properties, are well known and are available commercially. Generally speaking, these finely divided silicas have a particle size within the range of about 0.005 to about 0.05 micron. They can be prepared in various ways. For example, they can be prepared by the vapor phase hydrolysis of $SiCl_4$ below the sublimation temperature of silica, and particularly by the hydrolysis of $SiCl_4$ vapor in a hydrogen-oxygen flame. The colloidal silica can be prepared also by a water precipitation method wherein a precipitating agent, such as sodium bicarbonate, is added to an aqueous solution of an alkali metal silicate.

Exemplary commercially available colloidal silicas are those sold by Godfrey L. Cabot, Inc. under the trademark Cab-O-Sil M5, those sold by Degussa, Inc. under the trademark Aerosil R972, and those sold by Philadelphia Quartz Company under the tradmark Quiso F22.

Gelling agents which do not have the added feature of functioning as an abrasive can be used also. When such gelling agents are used, it will be usually necessary to include in the composition an abrasive material of the type described in detail hereinbelow. Examples of materials which are effective as gelling agents, but not as abrasives, include starch, cellulose, for example, carboxymethyl cellulose and carboxyethyl cellulose and synthetic resins such as ethylene oxide polymer, acrylamide/acrylic acid copolymer, and polyvinyl alcohol.

As mentioned above, the gelling agent should be used in an amount at least sufficient to impart to the composition a viscosity such that the composition does not flow excessively when it is applied to a vertical surface which is to be cleaned. An amount of gelling agent which causes the composition to solidify or cake should be avoided. The specific amount of gelling agent used will depend on a number of different factors, including the particular gelling agent used, the type of organic solvent used and the identity and amounts of other ingredients comprising the composition. In general, it has been found that good results can be obtained when the gelling agent comprises about 1 to about 5 wt. % of the composition, and preferably about 2 to about 5 wt. %. However, it should be understood that higher or lower amounts can be used to impart to the composition the viscosity properties mentioned above.

For the more severe cleaning applications, it has been found that it is necessary to include an abrasive in the cleaning composition of the present invention. This is usually preferred even when the gelling agent functions as an abrasive because it is not as effective as the abrasive materials described hereafter. The abrasives comprise powdered materials which are larger in particle size than the finely divided silicas mentioned above and function more effectively in penetrating and loosening the soils on the paint film. In general, the particle size of the abrasive should fall within the range of about 1 to about 5 microns. The abrasive should be a material which under the conditions of rubbing will not abrade the paint film significantly. In general, the abrasive should be a material which is softer than the paint film to avoid marring or abrading thereof. Examples of abrasives that can be used are synthetic calcium silicates, synthetic magnesium silicates, clays and iron oxides.

The abrasive should be used in amounts which are effective to penetrate and loosen the soil. However, there should be avoided amounts which tend to excessively dry the composition. The specific amount of abrasive will depend on the severity of the cleaning application, the particular abrasive used and the nature of the other constituents in the composition. In general, it is recommended that the abrasive comprise up to about 20 wt. % of the composition. However, it should be understood that higher amounts can be used depending on the other factors mentioned above. Preferably, the abrasive should comprise about 3 to about 15 wt. % of the composition.

For maximum versatility and effectiveness, the cleaning composition should contain also an alkaline cleaning agent. The alkaline cleaning agent functions to remove soils which resist being removed by the organic solvent or aids the organic solvent in removing soils. Whereas, the organic solvent is more effective in removing materials such as grease and oil and other hydrocarbons, the alkaline cleaning agent is effective in removing inorganic materials such as oxides and salts of strong and weak acids. Examples of alkaline cleaning materials that can be used include alkanolamines, caustic soda, soda ash and water soluble metal silicates and phosphates, including complex phosphates.

A preferred alkaline cleaning agent for use in the cleaning composition of this invention comprises an aqueous solution of a water soluble metal silicate and a water soluble metal phosphate. The amount of the water soluble silicate and phosphate in the aqueous solution should each comprise at least about 5 wt. % and it is preferred that they be present in amounts corresponding to their solubility limits. Examples of water soluble silicates that can be used include the alkali metal silicates, including ammonium silicate. Examples of water soluble phosphates that can be used include tetra potassium pyrophosphate, tetra sodium pyrophosphate, sodium tripolyphosphate and trisodium phosphate.

Particularly effective results have been attained by the use of an alkaline cleaning agent comprising monoethanolamine and an aqueous solution containing about 10 to 15 wt. % of tetra potassium pyrophosphate, about 35 to about 40 wt. % of sodium silicate and about 45 to about 55 wt. % of water.

The amount of alkaline cleaning agent incorporated in the cleaning composition of the present invention should comprise about 1 to about 15 wt. %. Lower amounts tend to give less cleaning action than that desired, and the higher amounts tend to affect adversely the stability of the composition. Most preferably the alkaline cleaning agent should comprise about 5 to about 15 wt. % of the composition.

The wetting agents for use in the cleaning composition of this invention are those anionic, cationic, amphoteric or nonionic surfactants which function to lower the interfacial tension between the foreign materials or soils present on the surface to be cleaned and the cleaning composition, and also the water which is used to rinse the cleaning composition from the surface. In addition, the wetting agent should reduce the surface forces between the cleaning composition and the water used to rinse it from the surface to which it is applied. Thus, the wetting agent functions to aid the cleaning composition in its penetrating action, and it functions also to aid in washing the cleaning composition and the soils from the surface when water is applied to rinse the composition from the surface.

The wetting agent can be selected from the wide variety of surfactants that are available. Exemplary of the groups of surfactants from which the wetting agent can be selected are the following: carboxylic acids such as fatty acids, rosin and naphthenic soaps; sulphuric acid esters such as alkyl sulphates, and those derived from alcohols and olefins, sulfated oils and esters, and sulfated amides and esters; sulfonic acids such as alkyl sulfonates, alkyl-aryl sulfonates and sulfonated amides and ethers, simple amine salts, quaternary ammonium salts, and amino amides and amidazolines; amphoteric compounds containing amino groups, carboxylic groups, sulfuric ester or sulfonic groups; and non-ionic compounds such as alkyl, alkyl-aryl ethers and thioethers and esters and amides. Particularly preferred wetting agents, with which excellent results have been attained, are those non-ionic compounds prepared by condensing alkyl phenols with ethylene oxides and those prepared by ethoxylating detergent alcohols.

It is recommended that the wetting agent comprise about 1 to about 10 wt. % of the composition, and preferably about 5 to about 10 wt. %. However, lower or higher amounts which will give the desired wetting properties can be used.

The composition can be prepared by mixing the ingredients in any desired manner. It is recommended that the composition be prepared by utilizing a high shear mixer. The solvent, and other ingredients such as the wetting agent, can be added to the mixer, and while stirring at a high speed, for example, about 2,000 to about 3,000 rpm, the gelling agent can be added thereto. Stirring is continued until a uniform gel is obtained, and thereafter, the abrasive is added to the stirred composition. Stirring is continued until the abrasive is dispersed uniformly throughout the composition. The gelled composition can then be poured or pumped out of the mixer into a suitable container.

The preferred composition can be characterized as a uniformly gelled material having an abrasive dispersed uniformly therethrough. In its preferred form, the gel is flowable and pourable, and thus it can be characterized as a liquid, but it does not flow readily. The preferred composition has sufficient body so that upon application to the surface to be cleaned, it remains thereon and does not run off.

Upon standing or storing, the abrasive and gelling agent may tend to settle. However, these materials can be redispersed uniformly throughout the composition by manual mixing just prior to use.

The cleaning composition can be applied to the surface to be cleaned in any suitable manner. For example, it can be sprayed on the surface, or applied with a sponge or cloth, or by machine buffing. The cleaning composition should be applied uniformly to the surface to be cleaned and should then be rubbed on the surface prior to drying. A light to medium rubbing action will generally be sufficient. As mentioned, the composition should be rubbed on the surface prior to the time it dries, that is, prior to the time the volatile solvent evaporates. If the solvent is allowed to evaporate before the surface is rubbed with the cleaning composition, the cleaning action of this ingredient is lost. Also, if the solvent evaporates, the abrasive tends to adhere tightly to the surface and is difficult to remove therefrom.

The cleaning composition should be rinsed from the surface after it has been applied thereto before it dries. Rinsing can be effected readily by simply applying water, for example, by spraying or hosing the surface with water. In general, large areas should be cleaned by applying the composition to small portions thereof, for example, about 4 sq. ft., and then promptly rubbing and rinsing the composition before it dries.

The cleaning composition can be applied as is, that is, in concentrated form. However, for applications in which the surface to be cleaned contains relatively small amounts of soil or soil which is removed easily, the composition can be diluted with water, for example, 2 to 3 parts of water per 1 part of cleaning composition.

It is believed that one of the principal uses of the cleaning composition will be the cleaning of painted aluminum siding. However, the composition can be used also to clean other surfaces. For example, it can be used to clean other painted metal surfaces such as galvanized surfaces, and also to clean painted wood surfaces. Although most aluminum paints are solvent based paints, the cleaning composition can be used also to clean surfaces painted with oil based and water based paints. Furthermore, the cleaning composition can be used to clean metal surfaces which are not covered with a final finish. For example, it can be used to clean the aluminum surfaces of airplanes which are covered with exhaust materials that include carbon deposits, oily materials, etc.

With respect to painted aluminum surfaces, it is noted that pastel shades of paint are being used on a wider scale in place of white paints. A problem encountered with pastel paints is that when the paint chalks, a relatively light film or light-colored particles appear as unsightly materials on the painted surface. The cleaning composition of the present invention can be used to clean the surface of these unsightly chalking materials, as well as of foreign materials or soils present thereon.

Examples below illustrate cleaning compositions within the scope of the present invention and their use in cleaning painted aluminum siding which was dirty and unsightly in appearance.

EXAMPLES

Example Nos. 1–8 in Table 1 below illustrate various types of cleaning compositions. Each of the compositions was prepared utilizing a high speed and high shear mixer, a Cowles blender. The solvent, alkaline cleaning agent and wetting agent was placed in the mixer and stirred at a speed of about 2,000 rpm for about 1 minute. While the composition was being stirred, the gelling agent was added and stirring was continued for about 15 minutes after which a uniform gel was obtained. The abrasive was added to the gelled composition and stirring was continued for another 15 minutes, after which the abrasive was dispersed uniformly throughout the composition. It will be noted that the ingredients and amounts thereof comprising Example Nos. 6 and 8 are the same. The composition of Example No. 6 was prepared as described above and Example No. 8 was prepared in the same way except that mixing times were increased from 15 minutes to 30 minutes.

TABLE 1

| Ingredients | Amts. of Ingredients in Wt. % Based on Total Wt. of Comp. Example Nos. | | | | | | | |
|---|---|---|---|---|---|---|---|---|
| | 1 | 2 | 3 | 4 | 5 | 6 | 7 | 8 |
| Stoddard solvent [1] | 73 | 73 | 68 | 68 | — | 73 | 72 | 73 |
| ethylene glycol monobutyl ether | — | — | — | — | 73 | — | — | — |
| gelling agent [2] | 2 | 4 | 2 | 2 | 2 | 2 | 3 | 2 |
| abrasive [3] | 15 | 13 | 15 | 15 | 15 | 15 | 15 | 15 |
| alkaline cleaning agent [4] | 5 | 5 | 5 | 10 | 5 | 5 | 5 | 5 |
| wetting agent [5] | 5 | 5 | 10 | 5 | 5 | 5 | 5 | 5 |

[1] aliphatic hydrocarbon solvent; boiling point 312°F–380°F; API gravity at 60°F–48.0
[2] colloidal silica having a particle size of 0.005 to 0.02 micron and sold by Godfrey L. Cabot, Inc. under the trademark Cab-O-Sil M5
[3] synthetic calcium silicate having an average particle size of 3.1 microns and sold by Johns-Manville Corp. under the trademark Microcel A
[4] monoethanolamine
[5] ethoxylated alcohol based on $C_{12}$–$C_{18}$ detergent alcohol with an average of 9 ethylene oxide units per mole of alcohol and sold by Shell Oil Co. under the trademark Neodol 25-9

Each of the compositions of Example Nos. 1–8 in Table 1 above was used to clean dirty aluminum siding painted with white paint on dwellings located in a highly industrialized area. The cleaning compositions were applied to the painted aluminum siding with a sponge or cloth and the dirty surface was rubbed lightly with the composition before it dried. The composition was rinsed from the surface before it dried by hosing with water. The results that were obtained can be described as good. The surfaces appeared clean and free of foreign material. Some vertical staining was observable when the siding was viewed from an angle.

It is noted that another composition similar to that of Example 1 was prepared, but differing therefrom in that it contained 63 wt. % Stoddard solvent and 25 wt. % of abrasive. This composition was very dry and dusty. This makes it more difficult to apply and remove. Thus, it is more advantageous to formulate cleaning compositions having the consistencies of the compositions of Example Nos. 1–8. The consistencies of these compositions can be described as a fluid paste.

Although the above-described cleaning compositions were effective in removing soils and foreign materials from the painted aluminum siding, more effective results can be obtained with the compositions of Example Nos. 9 and 10 in Table 2 below. Each of the compositions in Table 2 was prepared by adding the solvent, wetting agent and monoethanolamine to a mixer and stirring at about 3,000 rpm until the ingredients were mixed thoroughly. While stirring was continued, the alkaline cleaning agent was added and mixed thoroughly throughout the composition and thereafter the gelling agent was added. The composition was stirred for about 15 minutes after which a uniform smooth gel was obtained. While stirring was continued, the abrasive was added and stirring was terminated after about 15 minutes when the abrasive was dispersed uniformly throughout the composition.

TABLE 2

| Ingredients | Amts. of Ingredients in Wt. % Based on Total Wt. of Comp. Example Nos. | |
| --- | --- | --- |
| | 9 | 10 |
| Stoddard solvent[1] | 72.1 | 68.0 |
| ethylene glycol monobutyl ether | 5.6 | 5.5 |
| gelling agent[2] | 3.7 | 3.5 |
| abrasive[3] | 0.0 | 4.5 |
| monoethanolamine | 5.6 | 5.5 |
| alkaline cleaning agent: aqueous solution of silicate and pyrophosphate[4] | 7.4 | 7.5 |
| wetting agent[5] | 5.6 | 5.5 |

[1]aliphatic hydrocarbon solvent; boiling point 312°F–380°F; API gravity at 60°F–48.0
[2]colloidal silica having a particle size of 0.005 to 0.02 micron and sold by Godfrey L. Cabot, Inc. under the trademark Cab-O-Sil M5
[3]synthetic calcium silicate having an average particle size of 3.1 microns and sold by Johns-Manville Corp. under the trademark Microcel A
[4]aqueous solution prepared by mixing (a) 13.6 wt. % of tetrapotassium pyrophosphate, (b) 22.8 wt. % water and (c) 63.6 wt. % of an aqueous solution containing 61.3 wt. % water and 38.7 wt. % of a sodium silicate having an $SiO_2/Na_2O$ ratio of 3.22/1 and a density of 41.0°Be
[5]ethoxylated alcohol based on $C_{12}$–$C_{15}$ detergent alcohol with an average of 9 ethylene oxide units per mole of alcohol and sold by Shell Oil Co. under the trademark Neodol 25–9

The compositions of Example Nos. 9 and 10 were used in cleaning a dwelling having dirty white-painted aluminum siding. The dwelling was located in an industrialized urban environment. The cleaning compositions were applied from a sponge with a firm rubbing action. Prior to drying, the compositions were rinsed from the siding by hosing with water. The results that were obtained can be characterized as excellent. The siding was clean and no vertical staining was observed.

The cleaning compositions of Example Nos. 9 and 10 were used also to clean dirty white-painted aluminum siding on a dwelling located beneath the flight path to a major metropolitan airport. The composition was applied from a sponge with a firm rubbing action. Prior to drying, the composition was rinsed from the siding by hosing with water. The results obtained can be characterized as excellent.

The composition of Example No. 10 was used also to clean dirty white-painted aluminum rain gutters on a dwelling located in a coal mining area, the atmosphere of which tends to carry relatively large amounts of coal dust and acidic vapors. The cleaning composition was applied by a sponge with a light rubbing action and rinsed prior to drying by hosing with water. The results that were obtained can be described as excellent.

In summary, it can be said that the present invention provides a cleaning composition that has excellent versatility in that it can be used to clean a variety of different types of metal surfaces, either painted or unpainted, to remove therefrom different types of organic and inorganic soils. The cleaning composition can be applied easily to the surface to be cleaned and removed readily therefrom.

I claim:

1. A cleaning composition consisting essentially of:
A. about 55 to about 90 wt. % of an organic cleaning solvent selected from the class consisting of low molecular weight alcohols, mineral spirits, halogenated hydrocarbons and high boiling ethers;

B. about 1 to about 5 wt. % of a powdered gelling agent having abrasive properties, said gelling agent being colloidal silica having a particle size within the range of about 0.005 to about 0.05 micron;

C. about 1 to about 10 wt. % of a wetting agent selected from the class consisting of non-ionic, anionic, cationic and amphoteric surfactants;

D. about 1 to about 15 wt. % of an alkaline cleaning agent selected from the class consisting of alkanolamines, caustic soda, soda ash and water soluble metal silicates and phosphates;

E. 0 to about 20 wt. % of a powdered abrasive having a larger particle size than said powdered gelling agent.

2. A cleaning composition according to claim 1 consisting essentially of:

A. about 65 to about 80 wt. % of said organic cleaning solvent;

B. about 2 to about 5 wt. % of said gelling agent;

C. about 5 to about 10 wt. % of said wetting agent;

D. about 5 to about 15 wt. % of said alkaline cleaning agent; and
E. about 3 to about 15 wt. % of said abrasive.

3. A cleaning composition according to claim 1 wherein said organic cleaning solvent is Stoddard solvent; and wherein said alkaline cleaning agent comprises an aqueous solution of a water soluble metal silicate and a water soluble metal phosphate.

4. A cleaning composition consisting essentially of:
A. about 65 to about 75 wt. % of Stoddard solvent;
B. about 4 to about 7 wt. % of ethylene glycol monobutyl ether;
C. about 3 to about 5 wt. % of colloidal silica;
D. about 3 to about 8 wt. % of monoethanolamine;
E. about 5 to about 10 wt. % of aqueous solution containing: about 10 to about 15 wt. % of tetra potassium pyrophosphate, about 35 to about 40 wt. % of sodium silicate and about 45 to about 55 wt. % of water;
F. about 0 to about 15 wt. % of calcium silicate; and
G. about 5 to about 10 wt. % of nonionic wetting agent.

5. An organic-based cleaning composition consisting essentially of:
A. about 55 to about 90 wt. % of an organic cleaning solvent selected from the class consisting of low molecular weight alcohols, mineral spirits, halogenated hydrocarbons and high boiling ethers;
B. about 1 to about 15 wt. % of an alkaline cleaning agent selected from the class consisting of alkanolamines, caustic soda, soda ash, and water soluble metal silicates and phosphates;
C. a gelling agent in an amount sufficient to impart to the composition a viscosity such that the composition does not flow excessively when it is applied to a vertical surface to be cleaned wherein said gelling agent is selected from the class consisting of (i) starch, cellulose and synthetic resins, or (ii) colloidal silica having a particle size within the range of about 0.005 to about 0.05 micron; and wherein when said gelling agent is selected from class (i), said composition includes also
D. at least about 1 wt. % of an abrasive.

6. A method for cleaning a painted surface comprising applying thereto the cleaning composition of claim 5 and thereafter removing said composition.

7. A method for cleaning a painted surface comprising applying thereto the composition of claim 2 and thereafter removing said composition.

8. A method for cleaning a painted surface comprising applying thereto the composition of claim 3 and thereafter removing said composition.

9. A method for cleaning a painted surface comprising applying thereto the composition of claim 4 and thereafter removing said composition.

10. A method according to claim 6 wherein said surface is a painted aluminum surface.

11. A method according to claim 7 wherein said surface is a painted aluminum surface.

12. A method according to claim 8 wherein said surface is a painted aluminum surface.

13. A method according to claim 9 wherein said surface is a painted aluminum surface.

14. A composition according to claim 5 wherein said abrasive is said colloidal silica which is a material that has both gelling and abrasive properties.

15. A composition according to claim 5 wherein said gelling agent is selected from class (i).

16. A composition according to claim 15 wherein said abrasive is selected from the class consisting of synthetic calcium silicates, synthetic magnesium silicates, clays and iron oxides.

17. A method for cleaning a painted surface to remove therefrom soils accumulated thereon comprising applying to said surface an organic based cleaning composition consisting essentially of:
A. about 55 to about 90 wt. % of an organic cleaning solvent selected from the class consisting of low molecular weight alcohols, mineral spirits, halogenated hydrocarbons, and high-boiling ethers;
B. a gelling agent in an amount sufficient to impart to the composition a consistency such that said composition can be spread easily on said surface, but does not run off said surface, said gelling agent being selected from the class consisting of starch, cellulose, synthetic resin and colloidal silica having a particular size within the range of about 0.005 to about 0.05 micron; and
C. at least about 1 wt. % of an abrasive; and removing said composition from said surface.

18. A method according to claim 17 wherein said surface is a painted aluminum surface.

19. An organic-based cleaning composition consisting essentially of:
A. about 55 to about 90 wt. % of an organic-cleaning solvent selected from the class consisting of low molecular weight alcohols, mineral spirits, halogenated hydrocarbons, and high-boiling ethers;
B. about 1 to about 5 wt. % of a powdered gelling agent having abrasive properties, said gelling agent being colloidal silica having a particle size within the range of about 0.005 to about 0.05 micron;
C. about 1 to about 10 wt. % of a wetting agent selected from the class consisting of non-ionic, anionic, cationic and amphoteric surfactants;
D. about 1 to about 15 wt. % of an alkaline cleaning agent; and
E. 0 to about 20 wt. % of a powdered abrasive having a larger particle size than said powdered gelling agent.

20. An organic-based cleaning composition consisting essentially of:
A. about 55 to about 90 wt. % of an organic cleaning solvent selected from the class consisting of low molecular weight alcohols, mineral spirits, halogenated hydrocarbons and high-boiling ethers;
B. about 1 to about 15 wt. % of an alkaline cleaning agent;
C. a gelling agent in an amount sufficient to impart to the composition a viscosity such that the composition does not flow excessively when it is applied to a vertical surface to be cleaned, wherein said gelling agent is selected from the class consisting of (i) starch, cellulose and synthetic resins, or (ii) colloidal silica having a particle size within the range of about 0.005 to about 0.05 micron; and wherein when said gelling agent is selected from class (i) said composition includes also at least about 1 wt. % of an abrasive.

* * * * *